(12) United States Patent
Haley

(10) Patent No.: US 12,485,089 B1
(45) Date of Patent: Dec. 2, 2025

(54) ADHERING LOZENGE WITH HIGH AMOUNT OF SPARSELY SOLUBLE ACTIVE INGREDIENT

(71) Applicant: Quest Products, LLC, Pleasant Prairie, WI (US)

(72) Inventor: Jeffrey T. Haley, Mercer Island, WA (US)

(73) Assignee: Quest Products, LLC, Pleasant Prairie, WI (US)

( * ) Notice: Subject to any disclaimer, the term of this patent is extended or adjusted under 35 U.S.C. 154(b) by 0 days.

(21) Appl. No.: 19/078,590

(22) Filed: Mar. 13, 2025

(51) Int. Cl.
*A61K 9/00* (2006.01)
*A61K 33/10* (2006.01)
*A61K 47/26* (2006.01)

(52) U.S. Cl.
CPC ............ *A61K 9/0056* (2013.01); *A61K 33/10* (2013.01); *A61K 47/26* (2013.01)

(58) Field of Classification Search
None
See application file for complete search history.

(56) References Cited

U.S. PATENT DOCUMENTS

| | | | |
|---|---|---|---|
| 6,139,861 | A | 10/2000 | Friedman |
| 8,865,133 | B2 | 10/2014 | Haley |
| 8,945,606 | B2 | 2/2015 | Haley |
| 8,980,334 | B2 | 3/2015 | Domb |
| 9,688,779 | B2 | 6/2017 | Haley |
| 9,789,061 | B2 | 10/2017 | Haley |
| 12,233,158 | B2 * | 2/2025 | Haley ................ A23P 30/10 |
| 2004/0156930 | A1 | 8/2004 | Haley |
| 2009/0169489 | A1 | 7/2009 | Haley |
| 2010/0285098 | A1 | 11/2010 | Haley |
| 2012/0251622 | A1 | 10/2012 | Haley |
| 2015/0024092 | A1 | 1/2015 | Strehlow |
| 2015/0110851 | A1 | 4/2015 | Haley |
| 2015/0147555 | A1 | 5/2015 | Haley |
| 2015/0320787 | A1 | 11/2015 | Haley |
| 2016/0184236 | A1 | 6/2016 | Haley |
| 2017/0296487 | A1 | 10/2017 | Haley |
| 2018/0296466 | A1 | 10/2018 | Haley |
| 2021/0022998 | A1 | 1/2021 | Haley |
| 2022/0387309 | A1 * | 12/2022 | Haley ................ A61K 31/05 |

FOREIGN PATENT DOCUMENTS

WO          2006134409          12/2006

OTHER PUBLICATIONS

Images of Orajel® Benzocaine 15 mg Protective Mouth Sore Discs believed to be publicly available at least as of 2007 (2 pages).

* cited by examiner

*Primary Examiner* — Melissa S Mercier
(74) *Attorney, Agent, or Firm* — Fitch, Even, Tabin & Flannery LLP

(57) ABSTRACT

An oral adhering lozenge including a sparsely water-soluble active ingredient is provided. In one aspect, an oral adhering lozenge having at least 5 milliequivalents (mEq) of acid neutralizing capacity is provided. The acid neutralization capacity may be achieved with at least 200 milligrams of a sparsely water-soluble antacid, such as calcium carbonate. To achieve a fast enough speed of dissolution with such a large quantity of sparsely water-soluble active ingredient, one or more water-soluble ingredients acting as a compression binder and/or bulking agent that dissolves quickly in water is included in an amount equal to greater than the sparsely soluble active ingredient in the non-adhesive layer.

13 Claims, 1 Drawing Sheet

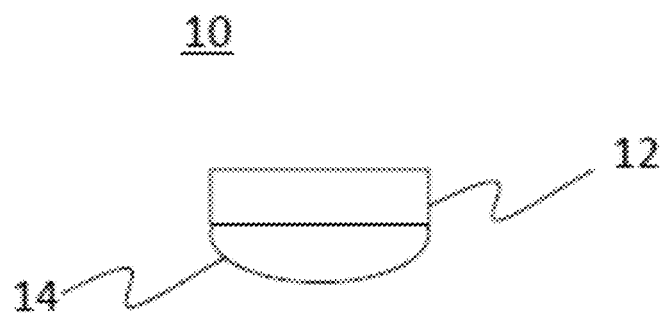

ADHERING LOZENGE WITH HIGH AMOUNT OF SPARSELY SOLUBLE ACTIVE INGREDIENT

FIELD

This application relates generally to adhering lozenges that deliver active ingredients having limited solubility in saliva.

BACKGROUND

Gastro-esophageal reflux disease (GERD), also called acid reflux, is caused by stomach acids rising into the esophagus. If untreated, it can cause an ulcer of the esophagus, which is a form of a peptic ulcer, can cause cancer, and can erode teeth. It is typically worst while sleeping when the body is reclined so that gravity does not hold stomach acid down, the flow of saliva (which is an antacid) is lowest while sleeping, and swallowing is infrequent. During the day, one can reduce acid reflux by stimulating saliva and frequent swallowing through the use of chewing gum or slowly dissolving lozenges or by drinking or eating.

Antacid tablets with acid neutralizing ingredients such as calcium carbonate, aluminum hydroxide, magnesium hydroxide, or sodium bicarbonate are commonly swallowed to neutralize acid in the stomach before it rises in the esophagus. When sufficient antacid is ingested to neutralize stomach acids, there can be undesirable side effects.

U.S. Pat. No. 6,139,861 issued to Mark Friedman surveys methods for adhering a mucoadhesive erodible lozenge or tablet or troche to a location within the mouth. These lozenges are formed using adhesive polymers such as hydroxymethylcellulose, polyacrylic acid, carbopol-934, and natural adhesives such as gelatin and acacia gum. An example of an oral adhering bi-layer lozenge is the adhering xylitol troche disclosed in U.S. Pat. No. 8,865,133, which is incorporated herein by reference.

To reduce GERD while sleeping, it is known to use an oral adhering tablet that releases flavor and thereby stimulates saliva. The saliva both neutralizes acids and washes acids in the throat down to the stomach.

BRIEF DESCRIPTION OF THE DRAWING

The FIGURE shows a side view or cross section of a bi-layer oral adhering lozenge made with a tablet press.

DETAILED DESCRIPTION

Provided herein are oral adhering lozenges comprising an active ingredient that is sparsely soluble in saliva but which lozenges are effective to deliver the active ingredient in therapeutically effective amounts. In one approach, the oral adhering lozenges comprise an antacid and, when adhered inside the mouth, are effective to release an amount of antacid component that is effective to neutralize acid in the mouth and throat. The adhering lozenges begin to dissolve in the mouth upon contact with saliva to facilitate the release of the active ingredient.

As used herein, a therapeutically effective amount is a quantity of an active ingredient that is sufficient to achieve a desired therapeutic effect, including to treat, ameliorate, or reduce a disease, a disease symptom, a disorder, or a condition, or to provide an otherwise detectable therapeutic effect, in a subject when administered. The therapeutically effective amount will vary depending on various factors, including the particular disease, disorder, or condition being treated, the subject's age, weight, and health, and the severity of the disease, disorder, or condition being treated. A therapeutically effective amount for a given situation can be determined by routine experimentation by a trained clinician.

For oral adhering lozenges comprising an antacid, the oral adhering lozenges are advantageously formulated to include at least 5 milliequivalents (mEq) of acid neutralizing capacity. At least in some approaches, the oral adhering lozenges provided herein are effective to reduce GERD. As the antacid is continually released from the adhering lozenges and migrates down the throat during swallowing of saliva, the antacid in the throat reacts with and neutralizes acid rising in the throat. This allows a smaller amount of antacid to be effective to reduce GERD because more of the neutralizing effect takes place in the mouth and throat rather than in the stomach. Advantageously, using a smaller amount of antacid also results in less neutralizing of acids in the stomach and can reduce undesirable side effects associated therewith.

The oral adhering lozenge described herein may be provided in the form of tablet-type lozenges comprising compressed powders and/or granules (hereinafter referred to individually or collectively as "particles") in at least two layers. In one aspect, the oral adhering lozenge comprises an adhesive layer and a non-adhesive layer. The adhesive layer has enough adhesive strength to adhere the oral adhering lozenge to a hard palette of a roof of a human's mouth and not fall off with the pull of gravity. The non-adhesive layer includes the active ingredient, such as the antacid component. The non-adhesive layer may also deliver any other optional ingredients (e.g., a therapeutic agent or flavor).

The oral adhering lozenges begin to dissolve in the mouth upon contact with saliva to facilitate the release of the antacid component and any other actives to be delivered. The oral adhering lozenges may be adhered onto any firm surface in the mouth, such as the hard (keratinized) mucosa, braces, teeth, or gums, and preferably to the outside of molars and adjoining gums, and the components of the lozenge are released into saliva in the mouth. Erosive forces at the surface of the lozenge, such as from rubbing against mucosa, teeth, and the tongue, and dissolution of a soluble bulking agent in saliva will progressively expose and release particles forming the lozenge.

While the present disclosure describes the oral adhering lozenges primarily in terms of the inclusion of antacid components that are sparsely soluble in saliva, it is also contemplated that any other sparsely saliva soluble active ingredients can be included in the oral adhering lozenges described herein, either in addition to or instead of the antacid component. As used herein, "sparsely water-soluble" or "sparsely saliva soluble" or similar term means that when 750 mg of a particulate material is placed in 1500 milliliters of distilled water in a beaker or flask for one hour at room temperature (i.e., at 69° F.), less than half of the particulate material has dissolved as determined by tare weighing filter paper (such as Fisherbrand™ P8 grade from Fisher Scientific) and filtering the water plus particulate matter though the filter paper. The filter paper with the particulate material is then dried and weighed to determine the weight of particulate matter retained on the filter paper.

It has been found that preferred active components in particulate form, such as antacid components like calcium carbonate, aluminum hydroxide, or magnesium hydroxide, do not readily dissolve in normal saliva. Many active components are also not compressible. Therefore, to include such active components in an oral adhering lozenge that releases the active component in an amount and at a rate suitable to have a therapeutic effect, the oral adhering lozenges further comprise one or more water-soluble components that act as a bulking agent and as a compression binder in the non-adhesive layer in sufficient quantities to provide the desired dissolution properties for the non-adhesive layer of the lozenge.

As used herein, the term "water-soluble" means that, when 750 milligrams of a particulate matter are pressed into a tablet of 12 mm diameter with a force of 32 kN and placed in 1500 milliliters of distilled water in a transparent beaker at room temperature (i.e., at 69° F.) and left for one hour, all or nearly all of the particulate matter will have gone into solution (and not be visible) in the water. Filter paper (such as Fisherbrand™ P8 grade from Fisher Scientific) is tare weighed. The solution is passed through the tare weighed filter paper and the filter paper is rinsed with about 50 milliliters of distilled water. To be considered water-soluble, no significant amount (i.e., 10 percent or less (or 75 milligrams or less)) of particulate matter is retained on the filter paper after rinsing with distilled water. To determine the amount of insoluble particulate matter on the filter paper, the filter paper and any particulates thereon is dried and then weighed again.

The one or more water-soluble components that act as a bulking agent and/or compression binder generally must be present in an amount equal to or greater than the amount of a sparsely saliva soluble active agent (e.g., antacid). The bulking agent and compression binder have three main functions: (1) fill volume (i.e., create space between active agent particles so that dissolution will proceed more quickly); (2) allow the non-adhesive layer with the sparsely soluble active agent to dissolve in saliva at a suitable rate to have a therapeutic effect; and (3) provide a mixture with the active agent that binds sufficiently to itself to provide a compressed non-adhesive layer that maintains its shape and strength after compression. Any water-soluble components that act as bulking agents and/or compression binders may be used, alone or in combination, so long as the above criteria are met in the resulting non-adhesive layer. In one approach, the compression binder may also be the bulking agent. In another approach, the compression binder may be a separate ingredient from the bulking agent.

In one aspect, the one or more water-soluble ingredients acting as a bulking agent and/or compression binder are compressible, which means that the material plastically deforms when compressed rather than fracturing into a fine powder. Examples of bulking agents that plastically deform (and are therefore also good compression binders) include mannitol, sorbitol, isomalt, maltitol, polydextrose, hydroxypropylcellulose, dextrin, maltodextrin, acacia gum, partially hydrolyzed guar gum, xanthan gum, fructose, and lactose, or other commercially available FCC or USP grade compressible dissolving bulking agents or binders. Other carbohydrates that do not plastically deform and therefore are not suitable compression binders include xylitol and sucrose. However, xylitol and sucrose can be used as water-soluble bulking agents when combined with a water-soluble compression binder. Further, nutritive sweeteners such as lactose, glucose, sucrose, and fructose, among others, can increase tooth decay (i.e., are cariogenic) and are therefore generally undesirable as bulking agents or compression binders.

In some approaches, compression binders that dissolve slowly (i.e., are not considered water-soluble as defined herein) may be used in small quantities in combination with more water-soluble bulking agents. For example, acacia gum may be used as a compression binder in an amount of about 2 to about 6 percent by weight of the non-adhesive layer. In another approach, carboxymethyl cellulose may be used as a compression binder in an amount of about 2 to about 6 percent by weight of the non-adhesive layer. And in another approach, one or more of maltodextrin and dextrin may be used as a compression binder in an amount of about 2 to about 15 percent by weight of the non-adhesive layer. Such compression binders are not suitable for use as a bulking agent due to their low solubility in saliva. Therefore, such ingredients may be used in small quantities as compression binders so long as they are used in combination with more water-soluble bulking agents. Similarly, the non-adhesive layer may include ingredients having adhesive properties so long as such ingredients are used in combination with other bulking agents and/or compression binders so that the resulting non-adhesive layer does not have adhesive properties and does not adhere to the inside of the mouth.

At least in some approaches, the antacid component and one or more water-soluble ingredients acting as a compression binder and/or bulking agent should be included in the non-adhesive layer in an amount effective to release the antacid component at a suitable rate to be effective in neutralizing acid in the mouth and throat. For example, as the amount of antacid relative to the amount(s) of bulking agent and/or binder goes up, the lozenge dissolves more slowly. If there is too much antacid component compared to the amount of water-soluble bulking agent and/or binder, the lozenge will dissolve so slowly that there will not be enough antacid flowing down the throat at any time to effectively neutralize acids coming up from the stomach. To provide a lozenge that dissolves at a suitable rate, inclusion of a bulking agent and/or binder that dissolves sufficiently fast in water or saliva will allow the use of a higher relative amount of antacid than when a more slowly dissolving bulking agent and/or binder is used.

The relative speeds of dissolution in water of exemplary water-soluble bulking agents and binders, from fastest to slowest, are polydextrose, sorbitol, maltitol, isomalt, mannitol, xylitol with 2% carboxymethylcellulose binder, and dextrin. At least in some approaches, polydextrose and/or sorbitol are preferred due to their fast dissolution rates in water. At least in some approaches, though it is slower to dissolve, maltitol may dissolve fast enough to be suitable for some applications or when used in combination with a lower amount of active or a higher amount of faster dissolving bulking agents and/or binders. The other listed non-cariogenic bulking agents and binders generally do not dissolve fast enough to be used with a sufficient amount of calcium carbonate or other sparsely saliva soluble antacid or other active agent necessary to be effective.

To compare the speed of dissolution of any ingredients acting as a binder and/or bulking agent to the speed of dissolution of isomalt, a tablet can be formed of each and the time of dissolution for each can be measured. As used herein, the term "rate of dissolution" when comparing one or more binder and bulking agent ingredients to isomalt refers to the following procedure. The tablets should have the same diameter, shape, and weight and should be prepared by pressing with the same compression force (e.g., 32 kN) using a tablet press. Two equal beakers (e.g., 2 L) each containing an equal amount of distilled water (e.g., 1.5 L) and each at the same room temperature (i.e., at 69° F.) and atmospheric pressure are prepared. One tablet containing isomalt (commercially available FCC or USP grade isomalt particles) is placed in one of the beakers of water. The other tablet formed of the test binder and/or bulking agent are placed in the other of the beakers of water. The two beakers are then visually observed to determine which of the tablets dissolves completely first.

Suitable antacid components include, for example, calcium carbonate, aluminum hydroxide, or magnesium hydroxide, or combinations thereof. At least in some approaches, calcium carbonate is preferred. The antacid component may be in the form of particles, preferably of a size smaller than 30 mesh. For example, calcium carbonate particles may have been made by any method, such as grinding or precipitation. Instead of or in addition to calcium carbonate, the non-adhesive layer may comprise one or more of calcium phosphate, mono-basic calcium salt, dibasic calcium salt, aluminum hydroxide, aluminum carbonate, aluminum phosphate, aluminum hydroxide, magnesium hydroxide, magnesium carbonate, magnesium glycinate, magaldrate, magnesium oxide, magnesium trisilicate, magnesium aluminosilicate, bismuth aluminate, bismuth carbonate, bismuth subcarbonate, bismuth subgallate, bismuth subnitrate, citrate ion salt, aluminate, carbonate, subcarbonate, subgallate, subnitrate, dihydroxyaluminum aminoacetate, dihydroxyaluminum sodium carbonate, sodium potassium tartrate, or tartrate salt.

The size of the oral adhering lozenge is generally limited by the nature of its intended placement inside of a person's mouth. However, the oral adhering lozenge should also be sufficiently large in size to deliver a sufficient amount of the antacid component to have the desired acid neutralizing functionality. At least in some approaches, the oral adhering lozenge has at least 5 milliequivalents of acid neutralizing capacity as measured by the procedure provided in the United States Pharmacopeia 23/National Formulary 18 which is stated below.

The total size of the oral adhering lozenge must be suitable for comfortable placement in a person's mouth. At least in some approaches, it is preferred that the lozenge has a total weight of at least about 700 milligrams, at least about 750 milligrams, at least about 800 milligrams, at least about 840 milligrams, or at least about 850 milligrams, and a total weight of less than about 950 milligrams, less than about 925 milligrams, less than about 900 milligrams, or less than about 890 milligrams. In one aspect, the lozenge has a total weight, inclusive of both the adhesive and non-adhesive layers, of about 700 milligrams to about 950 milligrams, about 800 milligrams to about 925 milligrams, about 840 milligrams to about 890 milligrams, and in another aspect about 860 milligrams.

The oral adhering lozenge should include a sufficient amount of adhesive in the adhesive layer to adhere the lozenge to a surface within the mouth when the adhesive layer is held there against. The lozenge should remain adhered to the surface within the mouth for a sufficient amount of time to release an effective amount of the sparsely soluble active ingredient, such as the antacid component. In one approach, the adhesive layer includes at least 60 percent, at least 70 percent, at least 75 percent, at least 80 percent, at least 90 percent, or at least 95 percent adhesive component by weight of the adhesive layer in order to provide sufficient adhesiveness to adhere the lozenge inside a user's mouth. The adhesive component may comprise one or more of acacia gum, gelatin, gum Arabic, alginate, starch, pectin, polyvinyl acid, polyvinylpyrrolidone, carboxymethylcellulose (CMC), hydroxymethylcellulose, polyacrylic acid, and carbomer. In a preferred aspect, the adhesive component is acacia gum. In one approach, when acacia gum is used, the adhesive layer may include about 95% to about 99% acacia gum and about 1 to about 5 percent alkaline ingredient, such as sodium bicarbonate, to neutralize acidity in the acacia gum and avoid exposing teeth to acid, in another aspect about 97% to about 99% acacia gum and about 1% to about 3% sodium bicarbonate to neutralize acids in the acacia gum. At least in some approaches, the adhesive layer is formed of a homogeneous mixture of the adhesive component and alkaline ingredient.

In some approaches, the adhesive layer has a total weight of about 90 milligrams to about 225 milligrams, about 100 milligrams to about 200 milligrams, about 125 milligrams to about 175 milligrams, or about 130 milligrams to about 165 milligrams.

In one aspect, the oral adhering lozenge includes at least 200 milligrams of the antacid component, in another aspect at least 250 milligrams, or at least 300 milligrams of the antacid component by total weight of the lozenge. At least in some approaches, the antacid component included in an amount of at least 200 milligrams, at least 250 milligrams, or at least 300 milligrams is calcium carbonate. In some approaches, at least 80%, at least 85%, at least 90%, at least 95%, or the entirety of the antacid component is included in the non-adhesive layer.

The oral adhering lozenges include a sufficient amount of antacid component to provide at least 5 milliequivalents (mEq) of acid neutralizing capacity. A suitable procedure for measuring milliequivalents (mEq) of acid neutralizing capacity of lozenges having a labeled dosage is provided in the United States Pharmacopeia 23/National Formulary 18 which reads as follows. All tests should be conducted at a temperature of 37±3° C. The pH meter should be standardized using 0.05 m potassium biphthalate and 0.05 m potassium tetraoxalate. Not fewer than 20 tablets (lozenges) should be weighed to determine the average tablet weight. The tablets are then ground to a fine powder, such as with a mortar and pestle, and mixed to obtain a uniform mixture. Then an accurately weighed quantity of the mixture, equal to the labeled dosage, is transferred to a 250 mL beaker. If wetting is desired, not more than 5 mL of alcohol (neutralized to an apparent pH of 3.5) is added and mixed to wet the mixture thoroughly. Then 70 mL of water is added to the beaker and the beaker is placed on a magnetic stirrer with a 40×10 mm (or other suitable size) magnetic stirring bar coated with solid perfluorocarbon and has a spin ring at its center. The power setting of the magnetic stirrer is adjusted to produce a stirring rate of about 300±30 rpm when the stirring bar is centered in the beaker, as determined by a suitable optical tachometer. The beaker is mixed for 1 minute. Then 30.0 mL of 1.0 N hydrochloric acid volumetric solution (VS) is added to the beaker by pipetting while continuing to stir with the magnetic stirrer. The mixture is stirred for 15 minutes, accurately timed, after the addition of the acid. Titration is begun immediately, and, in a period not to exceed an additional 5 minutes, the excess hydrochloric acid is titrated with 0.5 N sodium hydroxide VS to attain a stable (for 10 to 15 seconds) pH of 3.5. The number of mEq of acid consumed is then calculated with the following formula:

$$\text{Total } mEq = (30 \times N_{HCl}) - (V_{NaOH} \times N_{NaOH})$$

N=normality of hydrochloric acid VS
V=volume of sodium hydroxide VS used for titration
N=normality of sodium hydroxide VS
The result is expressed in terms of mEq of acid consumed per gram of the substance tested.

In one aspect, the non-adhesive layer of the oral adhering lozenge includes similar amounts of antacid component to water-soluble bulking agent and/or compression binder to enable the antacid component to be released rapidly enough in the mouth to have a therapeutic effect. At least in some approaches, the one or more water-soluble ingredients that act as a bulking agent and/or compression binder in the non-adhesive layer are present in an amount equal to or larger than the amount of a sparsely saliva soluble active agent (e.g., antacid). For example, in some approaches the non-adhesive layer includes about 20 percent to about 60 percent antacid component and about 30 percent to about 80 percent of one or more water-soluble ingredients acting as a water-soluble bulking agent and/or compression binder, in another aspect about 30 percent to about 50 percent antacid component and about 40 percent to about 70 percent of one or more water-soluble ingredients acting as a bulking agent and/or compression binder, in another aspect about 35 percent to about 45 percent antacid component and about 45 percent to about 65 percent of one or more water-soluble ingredients acting as a bulking agent and/or compression binder, and in another aspect about 35 percent to about 45 percent antacid component and about 45 percent to about 55 percent of one or more water-soluble ingredients acting as a bulking agent and/or compression binder, with the percentages based on the total weight of the non-adhesive layer. For example, when the lozenge includes at least about 200 milligrams, at least about 225 milligrams, at least about 250 milligrams, at least about 275 milligrams, or at least about 300 milligrams antacid component, the one or more water-soluble ingredient(s) acting as a bulking agent and/or compression binder are included in an amount of at least about 200 milligrams, at least about 225 milligrams, at least about 250 milligrams, at least about 275 milligrams, or at least about 300 milligrams. In some approaches, the non-adhesive layer may include up to about 15 percent additional ingredients, in another aspect up to about 10 percent additional ingredients.

In one particular approach, the one or more water-soluble ingredients acting as a bulking agent and/or compression binder in the non-adhesive layer includes one or more of polydextrose, sorbitol, and maltitol. In one aspect, the non-adhesive layer includes at least about 20%, at least about 30%, at least about 40%, or at least about 50% of one or more of polydextrose, sorbitol, and maltitol by weight of the non-adhesive layer. In one aspect, the non-adhesive layer includes at least about 200 milligrams, at least about 250 milligrams, or at least about 300 milligrams of one or more of polydextrose, sorbitol, and maltitol, and the non-adhesive layer also includes at least about 200 milligrams, at least about 250 milligrams, or at least about 300 milligrams of calcium carbonate.

The oral adhering lozenge also has suitable dimensions for comfortable placement in a person's mouth. For example, the oral adhering lozenge may have a diameter of about 10 mm to about 14 mm, about 11 mm to about 13 mm, or about 12 mm.

In one approach, the oral adhering lozenge has a total thickness (encompassing both the adhesive layer and non-adhesive layer) of about 4.5 to about 7.5 mm, about 5 to about 7 mm thick, about 5.5 to about 6.5 mm, or about 5.8 to about 6.1 mm. While lozenges of larger sizes may be provided in accordance with the present disclosure, lozenges of greater thickness may be less comfortable in the mouth. In one approach, the adhesive and non-adhesive layers may be relatively equal in thickness and/or total weight. In other approaches, the adhesive and non-adhesive layers may have different thicknesses and/or different total weights, the non-adhesive layer preferably being thicker.

It is generally desirable to include as much antacid component as practically achievable with a suitable rate of dissolution in the oral adhering lozenge. Accordingly, at least in some approaches, a non-adhesive layer may be thicker and/or have a higher total weight than the adherent layer. For example, the adhesive layer may have a thickness of about 0.7 mm to about 1.4 mm, about 0.8 mm to about 1.2 mm, about 0.9 mm to about 1.1, or about 1.0 mm. For example, the non-adhesive layer may have a thickness of about 3.8 mm to about 6.8 mm, about 4.0 mm to about 6.4 mm, about 4.4 mm to about 6.1 mm, or 4.7 mm to about 5.8 mm, or about 4.9 mm to 5.3 mm. This thicker non-adhesive layer allows for a significant amount of antacid component to be delivered in the non-adhesive layer (e.g., at least about 200 mg, at least about 250 mg, or at least 300 mg antacid component).

It may be desired for the lozenge to deliver the sparsely saliva soluble active ingredient, such as the antacid component, relatively quickly, such as in about 1 hour to about 4 hours when used while awake, or it may be intended for the lozenge to be used in the mouth during sleeping such that a desired rate of dissolution is about 4 hours to about 8 hours. Generally, it is preferred that the lozenges release the antacid component over a long dissolution time, such as about 2 to about 4 hours, or about 3 to about 4 hours, while awake and about 6 to about 8 hours, or about 7 to about 8 hours, while sleeping. Typically, the oral adhering lozenge will erode over time and completely dissolve in the mouth.

Other Components of the Oral Adhering Lozenge

Any remaining ingredients of the oral adhering lozenge should be selected to provide a dissolution time of the oral adhering lozenge appropriate for the antacid component or other sparsely saliva soluble active ingredient.

The oral adhering lozenge may comprise one or more flavor components that are effective to stimulate saliva production. In one approach, oil soluble or water-soluble flavors may be included. The flavors may include up to 8% artificial or natural flavor spray dried onto a water-soluble carrier, such as acacia gum or maltodextrin. The flavors may also include up to 30% xylitol. In yet another aspect, the flavors may include up to 0.4% sucralose.

For example, flavors such as cinnamon (e.g., ground cinnamon bark), mint (e.g., mint oil), almond, lavender, rose, spearmint, peppermint, wintergreen, eucalyptus, ginger, lemongrass, fruit flavor, fruit essence, or fruit extract, may be used. The flavor may also include a specific flavor compound, such as α-irisone, allyl caproate, anethole, iso-amyl acetate, iso-amyl butyrate, benzyl alcohol, butyl cinnamate, carvone, cinnamic alcohol, citral, gamma-decalactone, β-damascenone, decanal, decanol, γ-undecalactone, diacetyl, dihydroanethole, ethyl acetate, ethyl butyrate, ethyl cinnamate, ethyl salicylate, eucalyptol, ethyl maltol, eugenol, geranial, geraniol, heliotropine, 4-cis-heptenal, ionone, limonene, linalool, maltol, 1-menthyl acetate, menthone, methyl anthranilate, methyl-p-tert-butyl phenyl acetate, methyl cinnamate, methyl salicylate, neral, nerol, gamma-nonalactone, oxanone, octanol, octanal, phenylethyl alcohol, propenyl guaethol, α-terpineol, thymol, or a combination thereof. The flavor may also include a high intensity sweetener, such as, for example, one or more of aspartame, sucralose, saccharin, acesulfame potassium (Ace-K), neotame, advantame, cyclamate, alitame, neohesperidin dihydrochalcone, N-[N-[3-(3-hydroxy-4-methoxyphenyl)propyl]-L-a-aspartyl]-L-10 phenylalanine 1-methyl ester, N-[N-[3-(3-hydroxy-4-methoxyphenyl)-3-methylbutyl]-L- aaspartyl]-L-phenylalanine 1-methyl ester, N-[N-[3-(3-methoxy-4-hydroxyphenyl)propyl]L-a-aspartyl]-L-phenylalanine 1-methyl ester, and salts thereof, and steviol glycoside sweeteners, such as rebaudioside A, rebaudioside B, rebaudioside C, rebaudioside D, rebaudioside E, rebaudioside F, rebaudioside M, dulcoside A, dulcoside B, rubusoside, stevioside, and steviolbioside. The flavor may be provided in a variety of forms, such as in a powder (e.g., extruded, spray-dried, agglomerated, freeze-dried, and encapsulated flavorings). If not in powder form, the flavor component may be combined with a carrier (such as acacia gum, dextrin, maltodextrin, or cellulose gum) to form particles.

The oral adhering lozenge may further include one or more additional active ingredients (including active ingredients that are soluble or sparsely soluble in saliva), including therapeutic agents, active pharmaceutical ingredients ("APIs"), or any combinations thereof. Suitable APIs include those that can be delivered orally by absorption through mucous membranes of the oral cavity. The active ingredient may be a therapeutic agent, such as in the form of an inorganic compound, organic compound, peptide, protein, carbohydrate, amino acid, fatty acid, mineral, vitamin, and any combination thereof. Exemplary active ingredients include, for example, antibiotic, anesthetic, analgesic, antiviral, aspirin, anti-inflammatory, antacid, cannabidiol (CBD), antifungal (e.g., Nystatin, Clotrimazole), nicotine, caffeine, chamomile, hyaluronan (also known as hyaluronic acid), vitamin, mineral, plant extract, or herbal supplement.

The oral adhering lozenge may further include a variety of other ingredients, such as one or more binders, fillers, salts, buffers, coatings, glidants, and combinations thereof. These ingredients can be selected to provide desired appearance, flow, hardness, taste, and/or compression characteristics to the lozenge or one or more layers thereof. For example, the lozenge may include a thin water-soluble coating to maintain an attractive appearance and to minimize the release of dust from the lozenge. For purposes herein, any coatings are not considered a "layer," as the term "layer" is used to refer to compressed layers formed of compressed particles.

The oral adhering lozenge may also include a lubricant. The lubricant may act to lubricate the process of pushing tablets out of the dies of a tablet press. Any suitable lubricant may be used in the lozenge. In some embodiments, the lubricants may comprise one or more of calcium stearate and magnesium stearate. For example, to lubricate the ejection of tablets from dies of the tablet press, up to 2% magnesium stearate may be included based on the total weight of the oral adhering lozenge. In one aspect, the magnesium stearate is included only in the non-adhesive layer in order to minimize or avoid any adverse effect on the adhesiveness of the adhesive layer.

In some approaches, the oral adhering lozenges include less than about 30 percent xylitol, less than about 15 percent xylitol, less than about 10 percent xylitol, less than about 5 percent xylitol, or includes 0 percent xylitol based on the total weight of the non-adhesive layer. Generally, xylitol content is limited in the present lozenges because it is not compressible and, when combined with enough compression binder to also bind antacid molecules, the resulting lozenge dissolves too slowly and releases the antacid component too slowly to be useful to have a therapeutic effect. The limit on the amount of xylitol described herein applies to xylitol from all sources, including any xylitol included in flavor ingredients.

To give the oral adhering lozenge a soft mouthfeel, up to 3% sodium carboxy cellulose may be included based on the total weight of the non-adhesive layer, and it is also helpful as a compression binder.

Method of Making

The oral adhering lozenges described herein can be made by a method including forming a first particle mixture by mixing the antacid component and water-soluble bulking agent and/or compression binder, and lightly pressing the first particle mixture to form a non-adhesive layer. The method further includes forming a second particle mixture for the adhesive layer containing an adhesive component, and pressing the second particle mixture to form an adhesive layer on top of the non-adhesive layer. As shown in the FIGURE, lozenge 10 includes layers 12 and 14. In one approach, layer 12 may be the non-adhesive layer and layer 14 may be the adhesive layer.

It is contemplated that the second particle mixture may comprise additional components or, in some aspects, may only include the adhesive component, such as acacia gum. The adhesive layer becomes adhesive when wetted by saliva in a human mouth. In this manner, the oral adhering lozenge is configured to adhere to a surface of the human mouth when wetted by saliva in the mouth.

In one approach, the ingredients for the respective layers of the oral adhering lozenges are supplied in free-flowing particles suitable for flowing from one or more hoppers into a tablet press. The particles may be pressed into the respective layers of the lozenge using the tablet press. In some approaches, the lozenge may be manufactured using a bilayer tablet press having lower punches in dies and upper punches aligned above the dies. Particles may be fed to the tablet press using a hopper and table scraper or any other suitable feed system.

In one particular approach, a method of making lozenges for release of an active ingredient, such as an antacid component, in the mouth comprises: providing a tablet press with lower punches in dies and upper punches aligned above the dies; placing a first particle mixture in the dies, where the first particle mixture comprises the antacid component and the one or more water-soluble ingredients acting as a bulking agent and/or compression binder; inserting the upper punches into the dies; pressing the punches together to lightly compress the particles; adding into the dies a second particle mixture comprising an adhesive component; firmly compressing the second particles with the upper punch, thereby also further compressing the first particle mixture; and ejecting the tablets from the dies.

In some approaches, a force within the range of about 20 kilonewtons to about 45 kilonewtons and, in another aspect, within the range of about 25 kilonewtons to about 40 kilonewtons, and in another aspect in the range of about 30 kilonewtons to about 40 kilonewtons is applied to the two layers of particle mixtures to compress the ingredients to form the layers of the lozenge.

To further illustrate the present disclosure, the following examples are provided. It is to be understood that the examples are provided for illustrative purposes and are not to be construed as limiting the scope of the present disclosure.

EXAMPLES

Example 1

To identify suitable bulking agents and compression binders that dissolve quickly enough to allow suitable release of the preferred amount of antacid particles having low solubility in saliva, tablets of equal diameter (12 mm) and a weight of 750 mg±4 mg were made with commercially available particles of the bulking agents and/or compression binders listed in the table below, each compressed using a tablet press by placing the ingredients in a die and pressing with an equal pressure of 32 kN±3 kN to form the tablets. The tablets were simultaneously placed in equal size beakers (2 L) each containing an equal amount of water (1.5 L±15 mL) at room temperature (69° F.) and the time to complete dissolution was measured for each tablet. The dissolution times are shown below.

| Material | Dissolution time (minutes) |
| --- | --- |
| Polydextrose | 18 |
| Sorbitol | 20 |
| Maltitol | 29 |
| Isomalt | 38 |
| Mannitol | 50 |
| Xylitol with 2% caboxymethylcellulose binder | 60 |
| Maltodextrin (Fibersol-2 (ADM/Matsutani LLC) | 71 |
| Maize dextrin (NUTRIOSE ® FM06 (Roquette Freres)) | 81 |
| Wheat dextrin (NUTRIOSE ® FB06 (RoquetteFreres)) | 82 |
| Carboxymethylcellulose | 100 |
| Acacia gum (NEXIRA ® BA (Nexira (Societe Par Actions Simplifiee (SAS)) | 220 |
| Partially hydroly zed guar gum (SUNFIBER ® (Taiyo International, Inc.) | Test stopped after 225 minutes |

From the present experiment, it was identified that materials dissolving faster than isomalt would provide suitable dissolution rates to provide oral adhering lozenges that deliver a sufficient amount of sparsely soluble active component in a therapeutically effective amount of time. One or more of the other materials could also be included in limited amounts in a non-adhesive layer so long as higher amounts of more soluble materials are also included.

Example 2

An oral adhering lozenge with a suitable dissolution rate was formed of two compressed layers, including an adhesive layer and a non-adhesive layer containing calcium carbonate as an active. The layers were prepared according to the following formulation with a bi-layer tablet press having lower punches in dies and upper punches aligned above the dies. The dry ingredients of the non-adhesive layer were mixed and filled into the dies. The upper punches were then inserted into the dies, and the upper and lower punches were pressed together to lightly compress the non-adhesive layer mixture at a pressure of about 5 kN. The ingredients of the adhesive layer were mixed and then filled in the dies already containing the non-adhesive layer mixture. The adhesive layer mixture was then compressed with the upper punch (at a pressure of about 35 kN), thereby compressing the adhesive layer to the non-adhesive layer to form a tablet. The resulting tablets were then ejected from the dies.

Two percent sodium bicarbonate was included in the adhesive layer to neutralize acids in the acacia gum. The berry flavor used in the non-adhesive layer is water-soluble and is formed of a flavorant that is spray dried onto dextrin. Carboxymethylcellulose can be included at up to 3.5% of the non-adhesive layer to provide the oral adhering lozenge with a soft mouthfeel. When the resulting oral adhering lozenges were placed in the mouth, the lozenges eroded in about 1 to about 4 hours while the user was awake and about 4 to about 8 hours while the user was sleeping.

| Ingredients | % of Layer | Unit Weight (mg) |
| --- | --- | --- |
| Acid Neutralizing Layer (Non-Adhesive Layer) | | |
| Polydextrose | 52.4% | 385 |
| Carboxy-methyl Cellulose Gum | 2.7% | 20 |
| Calcium Carbonate particles coated with 5% dextrin to aid flow and binding | 36.4% | 268 |
| Berry flavor with dextrin | 7.5% | 55 |
| Sucralose | 0.2% | 1.4 |
| Magnesium Stearate | 0.8% | 5.9 |
| | | Subtotal: 735.3 mg |
| Adhesive Layer | | |
| Acacia Gum | 97.9% | 157 |
| Sodium Bi Carbonate | 2.0% | 3.2 |
| Sucralose | 0.1% | 0.16 |
| | | Subtotal: 160.36 mg |
| | | Total: 895.66 mg |

Example 3

An oral adhering lozenge including two compressed layers (an adhesive layer and a non-adhesive layer containing calcium carbonate as an active) was prepared according to the following formulation using the bi-layer press method described in Example 2. When the resulting oral adhering lozenges were placed in the mouth, the lozenges eroded in about 1 to about 4 hours while the user was awake and about 4 to about 8 hours while the user was sleeping.

| Oral Adhering Lozenge | | |
| --- | --- | --- |
| Ingredients | % of Layer | Unit Weight (mg) |
| Acid Neutralizing Layer (Non-Adhesive Layer) | | |
| Polydextrose | 51.4% | 369 |
| Carboxy-methyl Cellulose Gum | 2.9% | 21 |
| Calcium Carbonate | 36.5% | 262 |
| HydroxyPropylCellulose | 0.5% | 3.6 |
| Berry flavor with dextrin | 7.5% | 54 |
| Sucralose | 0.2% | 1.4 |
| Magnesium Stearate | 1.0% | 7.2 |
| | | Subtotal: 718.2 mg |
| Adhesive Layer | | |
| Acacia Gum | 98% | 142 |
| Sodium Bi Carbonate | 2.0% | 2.9 |
| | | Subtotal: 144.9 mg |
| | | Total: 863.1 mg |

Example 4

An oral adhering lozenge including two compressed layers (an adhesive layer and a non-adhesive layer containing calcium carbonate as an active) was prepared according to the following formulation using the bi-layer press method described in Example 2. When the resulting oral adhering lozenges were placed in the mouth, the lozenges eroded in about 2 to about 3 hours while the user was awake and about 4 to about 8 hours while the user was sleeping.

| Oral Adhering Lozenge | | |
| --- | --- | --- |
| Ingredients | % of Layer | Unit Weight (mg) |
| Acid Neutralizing Layer (Non-adhesive layer) | | |
| Sorbitol | 46.0% | 336.0 |
| Carboxy-methyl Cellulose Gum (CMC) | 1.5% | 11.0 |
| Calcium Carbonate | 41.7% | 304.8 |
| Xylitol with 2% CMC binder | 1.6% | 11.5 |
| Berry flavor with dextrin | 7.5% | 54.8 |
| Sucralose | 0.2% | 1.1 |
| Magnesium Stearate | 1.5% | 11.0 |
| | | Subtotal: 730.2 mg |
| Adhesive Layer | | |
| Acacia Gum | 98.0% | 132.3 |
| Sodium Bi Carbonate | 1.0% | 1.3 |
| Calcium Carbonate | 1.0% | 1.3 |
| | | Subtotal: 134.9 mg |
| | | Total: 865.1 mg |

All percentages and ratios are calculated by weight unless otherwise indicated. All percentages and ratios are calculated based on the total weight of the layer or composition unless otherwise indicated.

Reference throughout the specification to "an approach," "one approach," "another approach," "an aspect," "one aspect," and so forth, means that a particular element (e.g., feature and/or characteristic) described is included in at least one embodiment described herein, and may or may not be present in other embodiments. In addition, it is to be understood that the described elements for any embodiment may be combined in any suitable manner in the various embodiments unless the context clearly dictates otherwise.

In describing and claiming the examples disclosed herein, the singular forms "a", "an", and "the" include plural referents unless the context clearly dictates otherwise.

While several examples of the oral adhering lozenges have been described in detail, it is to be understood that the disclosed examples may be modified. Therefore, the foregoing description is to be considered non-limiting.

What is claimed is:

1. An oral adhering lozenge, comprising:
    at least two layers formed of compressed particles, one of the layers being an adhesive layer and another of the layers being a non-adhesive layer,
    wherein the non-adhesive layer comprises a mixture of particles including a sparsely water-soluble active ingredient to be released in the mouth and one or more water-soluble ingredients acting as a bulking agent and/or compression binder,
    wherein the sparsely water-soluble active ingredient is included in an amount of at least 225 milligrams, the total weight of the lozenge is about 800 milligrams to about 950 milligrams, and the one or more water-soluble ingredients acting as a bulking agent and/or compression binder is included in an amount of at least 225 milligrams, and
    wherein the one or more water-soluble ingredients acting as a bulking agent and/or compression binder are included in an amount equal to or greater than the amount of the sparsely water-soluble active ingredient.

2. The lozenge of claim 1, wherein the one or more water-soluble ingredients acting as a bulking agent and/or compression binder comprise at least one of polydextrose, sorbitol, and maltitol.

3. The lozenge of claim 2, wherein the one or more water-soluble ingredients acting as a bulking agent and/or compression binder comprise at least 40% polydextrose.

4. The lozenge of claim 2, wherein the one or more water-soluble ingredients acting as a bulking agent and/or compression binder comprise at least 40% sorbitol and/or maltitol.

5. The lozenge of claim 1, wherein the sparsely saliva water-soluble active ingredient comprises an antacid component.

6. The lozenge of claim 5, wherein the antacid component comprises at least 250 milligrams of calcium carbonate.

7. The lozenge of claim 1 having a total weight less than 900 milligrams.

8. An acid neutralizing adhering lozenge, comprising:
    at least two layers formed of compressed particles, one of the layers being an adhesive layer and a second layer being a non-adhesive layer comprising at least 200 milligrams of a sparsely water-soluble antacid and at least 200 milligrams of one or more water-soluble ingredients acting as a bulking agent and/or compression binder,
    wherein the lozenge has at least 5 milliequivalents of acid neutralizing capacity as measured by the procedure provided in the United States Pharmacopeia 23/National Formulary 18, and
    wherein the one or more water-soluble ingredients acting as a bulking agent and/or compression binder are included in an amount equal to or greater than the amount of the sparsely water-soluble antacid.

9. The lozenge of claim 8, wherein the one or more water-soluble ingredients acting as a bulking agent and/or compression binder comprises least one of polydextrose, sorbitol, maltitol, isomalt, and mannitol.

10. The lozenge of claim 8 having a total weight less than 950 milligrams.

11. The lozenge of claim 10 having a total weight less than 900 milligrams.

12. The lozenge of claim 8 comprising at least 225 milligrams of calcium carbonate as the sparsely water-soluble antacid.

13. The lozenge of claim 8 comprising at least 250 milligrams of one or more of calcium carbonate, calcium phosphate, mono-basic calcium salt, dibasic calcium salt, aluminum hydroxide, aluminum carbonate, aluminum phosphate, aluminum hydroxide, magnesium hydroxide, magnesium carbonate, magnesium glycinate, magaldrate, magnesium oxide, magnesium trisilicate, magnesium aluminosilicate, bismuth aluminate, bismuth carbonate, bismuth subcarbonate, bismuth subgallate, bismuth subnitrate, citrate ion salt, aluminate, carbonate, subcarbonate, subgallate, subnitrate, dihydroxyaluminum aminoacetate, dihydroxyaluminum sodium carbonate, sodium potassium tartrate, and tartrate salt as the sparsely water-soluble antacid.

* * * * *